United States Patent

[11] 3,581,064

[72] Inventor Ansell W. Palmer
Hampton, N.H.

[21] Appl. No. 820,539
[22] Filed Apr. 30, 1969
[45] Patented May 25, 1971
[73] Assignee Honeywell Information Systems Inc.

[54] RECORD SCANNER WITH LOADING AND INDEXING MEANS
10 Claims, 7 Drawing Figs.

[52] U.S. Cl. .......... 235/61.11D, 179/100.2T, 235/61.12M, 274/4H, 340/174.1C
[51] Int. Cl. .......... G06k 7/015, G11b 5/82, G11b 25/04
[50] Field of Search .......... 179/100.2 T; 235/61.114, 61.115, 61.12 M; 340/174.1 C; 274/10, 4

[56] References Cited

UNITED STATES PATENTS

| | | | |
|---|---|---|---|
| 2,914,746 | 11/1959 | James | 235/61.114 |
| 3,210,082 | 10/1965 | Murata | 179/100.2 |
| 3,417,998 | 12/1968 | Horzick | 274/10 |
| 3,418,456 | 12/1968 | Hamisch | 235/61.115 |

*Primary Examiner*—Stanley M. Urynowicz, Jr.
*Assistant Examiner*—Howard W. Britton
*Attorneys*—Fred Jacob and Edward W. Hughes

ABSTRACT: A record scanner is loaded by an operator placing a record on a locating pin while in an open position. Upon closing, the record is transferred to a probe which indexes the record for circular scanning by a rotary transducer.

INVENTOR.
ANSELL W. PALMER
BY Warren F.B. Lindsley
ATTORNEY

RECORD SCANNER WITH LOADING AND INDEXING MEANS

BACKGROUND OF THE INVENTION

This invention relates to ticket, label, card and merchandising tag reading, writing and interpreting and more particularly to an improved magnetic device for accomplishing these functions.

1. Field of the Invention

The novel device for reading as well as recording magnetically encoded information disclosed, has particular application information processing systems and equipment wherein devices of this type are employed for entering into the system digital information that has been stored on individual items of recording media such as, for example, magnetically treated tickets, cards, tags, labels, etc.

While the various information reading and writing features and principles of this invention find utility in a broad range of applications, for the purpose of clarity and illustration the invention is hereinafter described in connection with one specific environment, namely a department store or food market checkout counter or cashier. In this environment, the claimed device automatically reads from merchandising media data such as the price of an article, its inventory and vendor identification and any other required information regarding the merchandise. If a credit card of a customer is being read, the device will automatically read customer identification, credit rating, master file information and any other data recorded on the card. The information read is then entered into a suitable utilization device, for example, a data processing system.

The magnetic recording and reading device disclosed in also capable of writing on a magnetic track on the recording medium information stored or written into the data processing system. Thus, information on recording media may be modified, changed and updated as the situation warrants.

2. Description of the Prior Art

The customary purchasing procedure utilized in department stores, food markets and the like, is to have the purchaser bring the goods selected to a sales clerk who looks for a label on the goods indicating the price thereof and then proceeds to ring up the sale on the cash register. In many instances, the clerk also fills out associated paper work or forwards information on the sale to office personnel who credits the sales person with the sale, updates the inventory record, reorders the item for inventory, checks the purchaser's credit rating if the sale is a charge matter, etc. Attempts have been made to introduce the benefits of automatic data handling by using special markings or perforations on the label to permit scanning of the tag or label by special data processing equipment. Such equipment has been expensive and cumbersome and the benefits of data processing while suitable for customer buying situation, as exemplified by department store and food market situations, has not been extended to these marketing areas of the business world.

In general, magnetic storage media allow a higher stored information density and greater flexibility with respect to stored information format than do perforated media such as punch cards, tickets and tapes. In addition, there is essentially no wear of mechanical parts nor creation of byproduct debris as there is with respect to the punch-type of storage media.

Tickets, cards, labels and merchandising tags treated with magnetic material which potentially incorporates all of the above-noted advantages of storage have not been commonly employed because they normally require for the record and readout process complex scanning mechanisms. To eliminate the scanning problems, there has been developed a recording device for reading and writing commercial information on this type of magnetic media. This information is written upon concentric circular tracks then scanned and read by recording heads rotated relative to the recording media.

If a careful alignment is made between the recording media and the recording heads, circular scan eliminates the necessity for complex scanning mechanisms. Where a limited amount of information is required, only one or two circular recording channels may be needed. However, if additional circular channels are required for more information, the additional complexity with respect to read record heads is minimal. In a circular scanning arrangement of the type disclosed, it is of utmost importance that the recording media be precisely aligned with the magnetic recording device. Such precise alignment for various-shaped recording media has been accomplished in an effective manner by the claimed device.

SUMMARY OF THE INVENTION

In accordance with the invention claimed, an improved magnetic recording device providing a novel magnetic recording media loading mechanism is provided which repeatedly positions magnetic recording media accurately in a selected position against a recording head of a transducer mechanism. The loading mechanism holds and locks the recording media in the selected position each and every time the loading mechanism places the recording media against the recording head.

It is, therefore, one object of this invention to provide an improved magnetic recording device.

Another object of this invention is to provide an improved loading mechanism for accepting and removing recording media repeatedly to and from a given position adjacent a recording head of a transducer.

A further object of this invention is to provide an improved magnetic recording device utilizing ticket, card, label and merchandising tag-type magnetic recording media wherein information is recorded upon concentric circular tracks by rotating read-record magnetic heads and which device includes novel means for precisely aligning the recording media with respect to the read-record heads.

A still further object of this invention is to provide a novel read-record device which is arranged for accommodating magnetic recording media in the form of tickets, cards, tags, labels and the like which need not be of a uniform size or configuration.

A still further object of this invention is to provide an information media loading mechanism for a read-record device which is simple to operate and substantially error free.

Other objects and advantages of the present invention will be apparent from the following specification taken in conjunction with the accompanying drawings.

BRIEF DESCRIPTION OF THE DRAWINGS

Referring more particularly to the drawings by characters of reference, FIG. 1 is a perspective view of an operable embodiment of a magnetic reading and recording device 10 which performs both record and readout functions. The principal use of the illustrated device is for recording information on ticket, tag, label and card-type magnetic recording media for providing storage of this information, and subsequently reading out the information for the purpose of entering the same into information processing equipment of various kinds. It is to be understood that this disclosure is only one application for the embodiment of the invention and is being used for illustrative purposes only.

Figure 3:
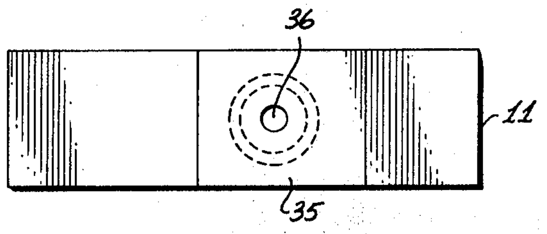
FIG. 3 is a top view of one form of recording medium that may be used with the recording device disclosed.
Figure 4:
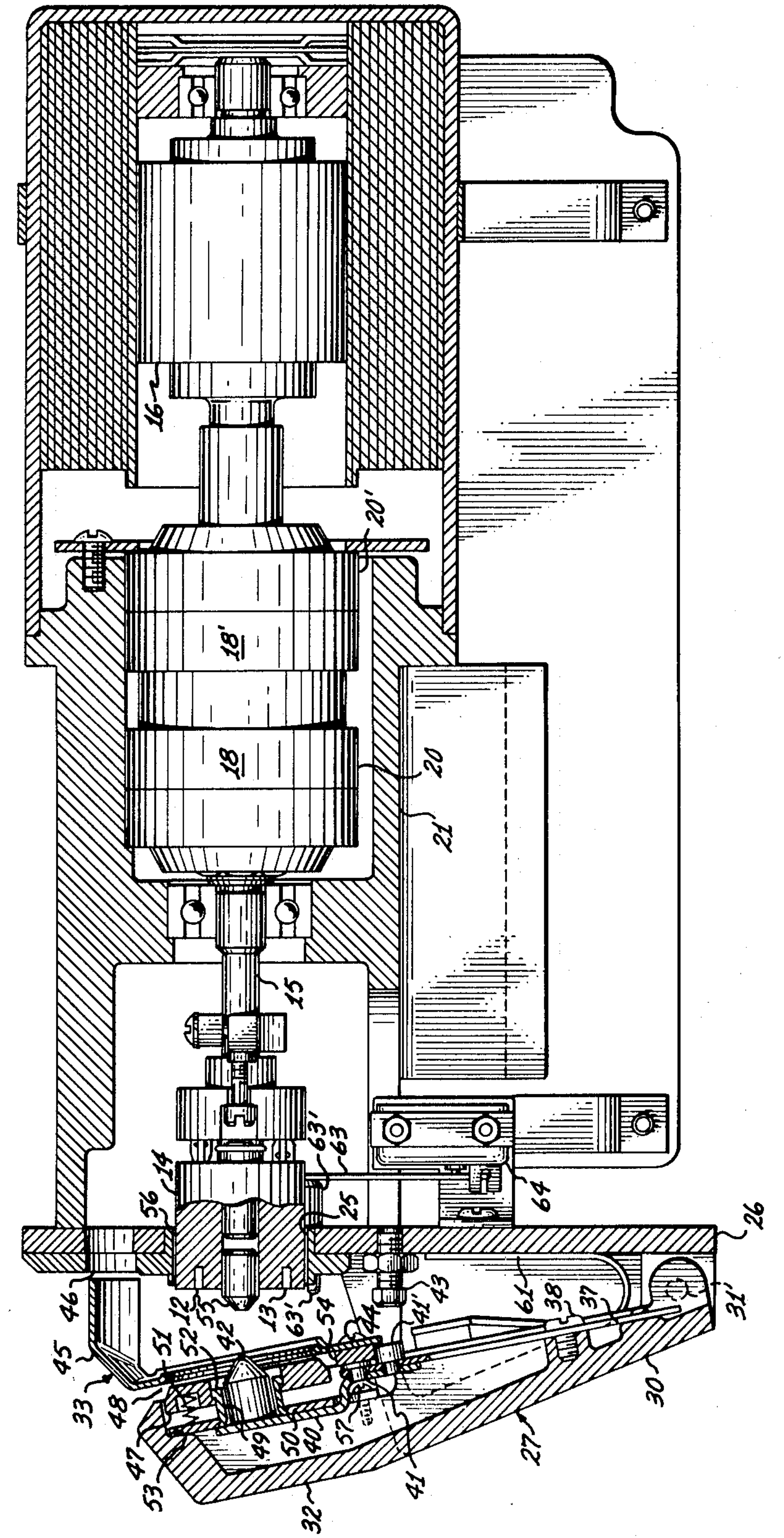
FIG. 4 is a cross-sectional view of FIG. 1 taken along the line 3–3.

As will be more clearly illustrated in FIGS. 2—6 and from the following explanation, the magnetic device 10 is arranged to receive a ticket 11 (shown in FIG. 3) in operating proximity to two read-record heads 12 and 13 shown in FIG. 4. Each head has a pair of magnetic pole pieces encased in a head supporting structure 14 that is secured for limited axial movement to a rotatable shaft 15. The shaft 15 is rotated by a synchronous motor 16. Also secured to shaft 15 are rotor windings 17, 17', shown in FIG. 7, of a pair of rotary transformers 18 and 18', each of which also comprise stator windings 19, 19'. The stator windings are each covered by a stator shell 20, 20' fixedly supported by a housing 21. The rotor windings of transformers 18, 18' are connected by a pair of wires 22, 22', respectively, to the winding 23, 23', respectively, of the read-record heads 12 and 13.

The head supporting structure 14 is made to rotate within an opening 25 in a plate 26 which forms a front panel of the housing of the read-record device. To this front panel is attached the ticket loader assembly 27.

Ticket loader assembly 17 comprises a loading door 30 which is pivotally mounted by a pin 31 to plate 26. Door 30 defines a hollow cup-shaped member 32 which encompasses the juxtapositioned end of the head supporting structure 14 when the door is in the ticket reading position adjacent the read-record heads 12 and 13.

Door 30 has a card, tag, label and ticket receiving attachment 33 arranged within its hollow configuration. This attachment receives suitable information media such as, for example, tickets 11. The medium, which may have a rectangular configuration, is typically composed of an inexpensive fibrous material, such as plain or plastic coated cardboard. By conventional fabrication techniques, a magnetic recording surface is formed on a confined area 35 of one surface of the medium. The magnetic material is typically iron oxide deposited, for example, by a coating or laminating process, to a thickness of a few mils. Where a plastic coating is employed, the magnetic recording surface may be formed either underneath or on top of the plastic layer. An aperture 36 is provided at approximately the center of the recording surface. The remaining surface area of the ticket is available for printing, photographic matters, etc.

The recording surface 35 has a fixed, predetermined spatial relationship with respect to at least one adjacent edge of the recording medium and preferably borders said edge as illustrated in FIG. 3. As will be seen, such construction makes possible a proper alignment of the recording surface within the magnetic reading and recording device, essentially independent of the size and configuration of the recording medium.

The ticket receiving attachment 33 is mounted at the free end of a cantilever spring 37 within the cup-shaped portion of door 30. Cantilever spring 37 is fastened by a threaded bolt 38 to the lower portion of door 30 adjacent its pivotal mounting pin 31.

The ticket receiving portion of ticket receiving attachment 33 comprises a resiliently mounted bracket 40 which is fastened by a pair of rivets 41, 41' at one of its ends to the free end of cantilever spring 37. At the other end of bracket 40 a ticket detent pin 42 is attached so as to protrude laterally from bracket 40 toward the head supporting structure 14. The head of rivet 41' engages with an adjustable stop pin 43 fastened to bracket 26. Back guide 45 is secured to door 30 by a few bolts 44 and is arranged adjacent to but outside of the confine of the hollow cup-shaped portion of door 30. As shown in FIGS. 1, 4, 5 and 6, the back guide moves with door 30 and extends through an opening 46 in plate 26 during a door closing operation.

Figures 5, 6, 7:
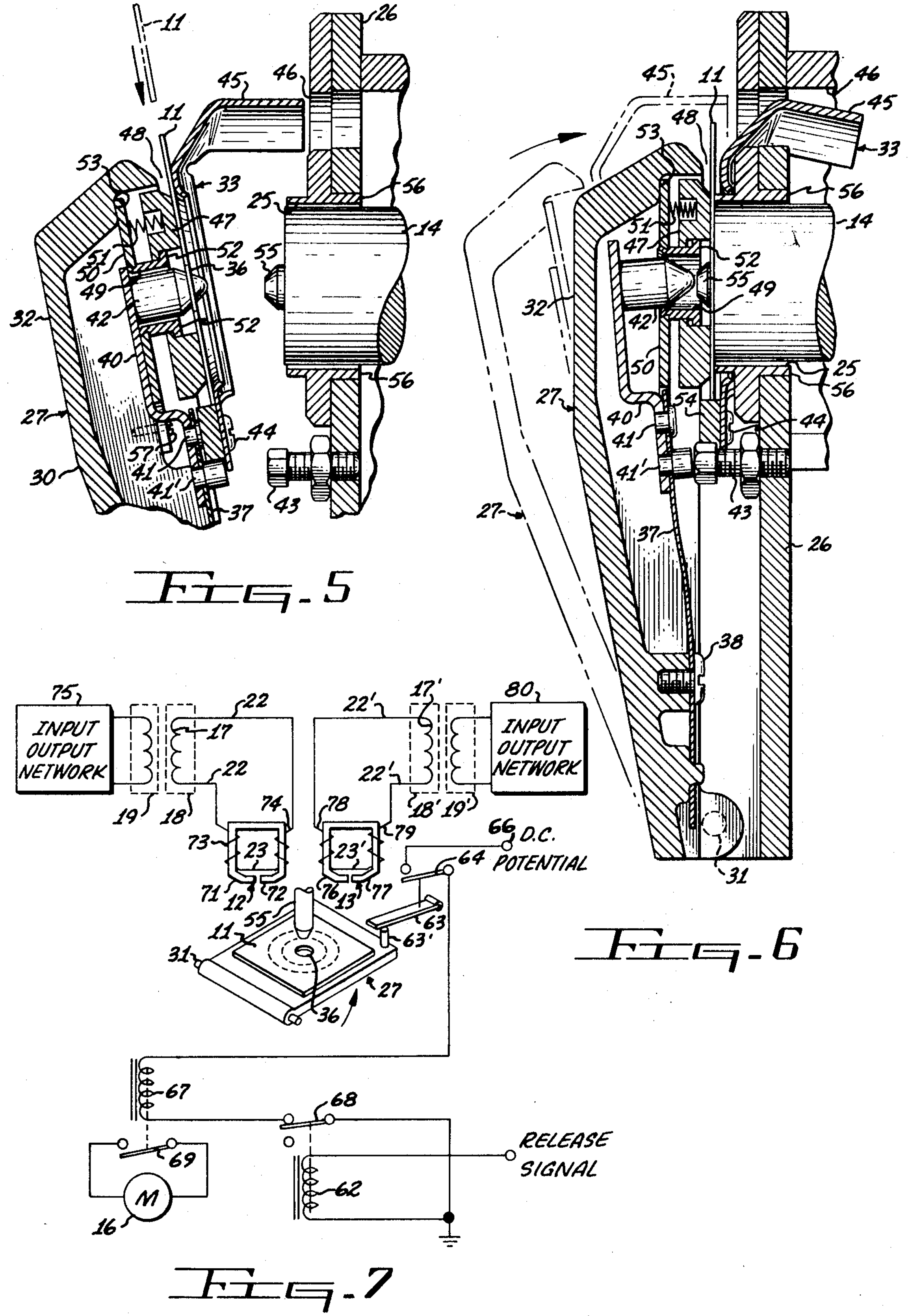
FIG. 5 is an enlarged partial cross-sectional view of the hinged ticket holding door shown in FIG. 1 with the ticket illustrated in the unlatched probe holding position.
FIG. 6 is an enlarged cross-sectional view of the hinged ticket holding door shown in FIGS. 1 and 5 with the door shown in full lines in latched position and the ticket in reader probe holding position.
FIG. 7 is a schematic diagram of the electrical connections made to the magnetic recording device shown in FIGS. 1 and 4.

Back guide 45, more particularly, is juxtapositioned with an annular pressure plate 47 and together with pressure plate 47 defines a narrow slot 48 for receiving ticket 11. Pressure plate 47 is slidably mounted for movement axially along a hub 49 which is fixedly secured to a plate 50. Plate 50 is secured to door 30 by two screws 57 so that hub 49 extends around detent pin 42, as shown in FIGS. 4, 5 and 6. Three coil springs 51 (only one of which is shown in FIGS. 4, 5 and 6) are equally angularly spaced around hub 49 and extend between plate 50 and annular ring 47. These springs bias annular ring 47 axially along hub 49 causing the ring to be biased into engagement with an annular outwardly extending lip 52 on hub 49, as shown in FIGS. 4 and 5. Plate 50 is held against stop 53 formed on the inside surface of the cup portion of door 30 by screws 57.

During a ticket insertion operation, ticket 11 is placed with its magnetic oxide side facing the head supporting structure 14 into the ticket insert slot 48 located between back guide 45 and pressure plate 47. The act of sliding the ticket into position deflects detent pin 42 backward in door opening direction. During the ticket insertion operation, the ticket moved downwardly into slot 48 until the ticket strikes a stop member 54 attached to door 30. As aperture 36 os ticket 11 is positioned or located around the detent pin, the bias of spring 37 forces the detent pin 42 through the ticket aperture 36, retaining the ticket in position without further effort. This aligns the ticket with the read head pin 55 preparatory to door closing. Pin 55 extends laterally from the surface of the head supporting structure 14 and is arranged axially with detent pin 42 when door 30 is read-record position.

As the door is moved to its closed position, stop pin 43 engages the head of rivet 41', causing bracket 40 and detent pin 42 to be deflected before or at the time that the detent pin 42 touches the end of read head pin 55. When the door is completely closed, detent pin 42 is deflected in the direction of door opening so that it is not in contact with read head pin 55. This is important since the pressure against the ticket must be controlled to insure an accurate read and record operation. Pressure against the read head pin might put an undesirable load on the synchronous motor 16 during its head rotating function.

As noted from FIG. 6, pressure plate 47 is biased in the door opening direction against the biasing action of coil springs 51 by the movement of ticket 11 into engagement with an anvil 56 which supports the head supporting structure 14 in plate 26. Thus, ticket 11 is firmly clamped flat so that the read-record heads 12 and 13 will, in turn, be held against the ticket medium by the spring biased head supporting structure 14.

Figure 1:
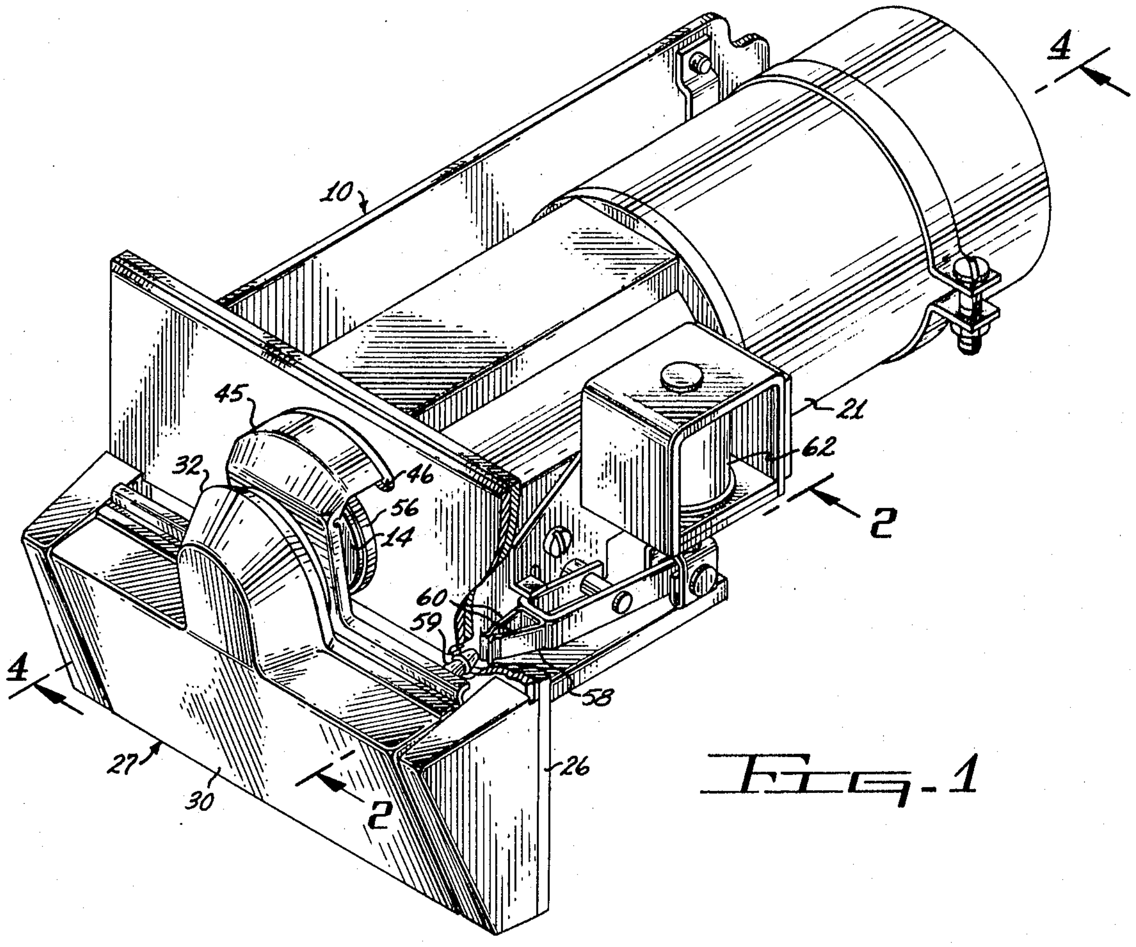
FIG. 1 is a perspective view of a magnetic recording device and embodying the invention.
Figure 2:
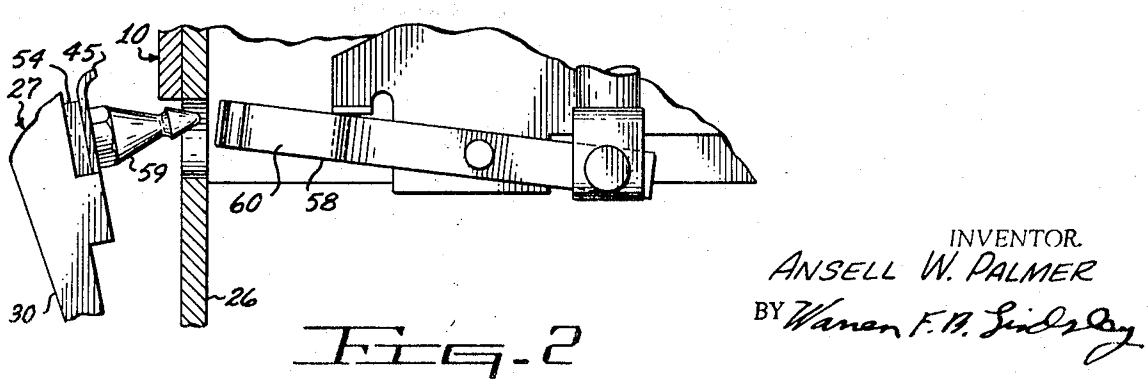
FIG. 2 is a cross-sectional view of FIG. 1 taken along the line 2–2 showing the ticket loader latching assembly.

Door 30 is held in the closed position by a pivotally mounted door latch spring clip 48 shown in FIGS. 1 and 2. A latch pin 59 mounted on back guide 45 and attached to door 30 moves in between a pair of spring arms 60 of spring clip 58 and is held thereby in door closed position in cupboard door style during a reading and recording operation. When the read-record function has been completed, a door latch solenoid 62 mounted on housing 21 actuates its plunger to cause the pivotally mounted spring clip 58 to moved downward thereby releasing loading door 30. The door moves to its open position under action of lead spring 61. If it does not open automatically, it may be easily opened manually by pulling the door toward its open position.

As noted from the figures of the drawings, the ticket may be inserted from the top or either side of the loading door. Stop 54 serves as a guiding rail so that the ticket may be moved laterally of the axis of detent pin 42 along stop 54 until the aperture in ticket 11 is placed around pin 42. When the ticket is clamped against the anvil 56 by the annular pressure plate 47, excessive pressure against the read-record heads 12 and 13 is prevented by anvil 56. This anvil maintains a fixed spacing between the pressure plate 47 and plate 26, while the head supporting structure 14 is free to move laterally on shaft 15. This movement is biased in door opening direction by a spring (not shown) so that the read-record heads are in constant contact with the media.

Read head pin 55 is fixedly spaced with respect to the path of travel of the read-record heads, that is, precisely at the center of the circular magnetic tracks formed on ticket 11.

Upon insertion of the recording medium in the ticket receiving attachment 33 and closing of door 30, an actuating pin 63' actuates a microswitch 64 upon deflecting of its arm 63 thereby causing closure of the contacts of the microswitch and energization of the synchronous motor 16. Energization of motor 16 causes rotation of the read-record heads 12 and 13 which circularly scan the magnetic tract on area 35 of ticket 11. The read-record heads record on and read out (typically in a nondestructive manner) from one or more of the concentric circular tracks on the recording surfaces or areas of ticket 11. The magnetic record and read-out processes, per se, are standard and need not be further described.

The actuating arm 63 and actuating pin 63' of the microswitch is positioned adjacent head supporting structure 14 so that the switch is actuated only when the recording medium is in read-record position. If the recording medium is not in position, the switch is not actuated.

The electrical circuit of the recording device of FIG. 1 is schematically illustrated in FIG. 7. With reference to FIG. 7, upon ticket 11 being fully inserted into the ticket receiving attachment 33 and door 30 closed, this action causes microswitch 64 to close. A DC potential is then applied from terminal 66 through microswitch 64, solenoid 67, and switch 68 to ground. Energization of solenoid 67 causes closure of the contacts of a switch 69 which cause energization of motor 16 which commences rotation of read-record heads 12 and 13.

Read-record head 12 includes a pair of magnetic pole shoes 71 and 72 which may have serially adding signal windings 73 and 74, respectively, wound thereabout. Windings 73 and 74 comprising winding 23 are connected to rotor winding 17 of rotary transformer 18. Inductively coupled to rotor winding 17 is stator winding 19 which is connected to an input output network 75. In a comparable manner, read-record head 13 includes a pair of magnetic pole shoes 76 and 77 having serially adding signal windings 78 and 79, respectively, coupled to rotor winding 17' of rotary transformer 18'. Windings 78 and 79 comprise winding 23'. Stator winding 19' is connected to a second input-output network 80.

Input output networks 75 and 80 are shown in block form since they do not form an actual part of this invention. The networks may each include conventional amplifier circuitry, gating means, connecting means, as well as other conventional components that may be necessary for applying electrical signals to and receiving signals from the illustrated recording device. Thus, during the record sequence, network 75 applies an electrical signal to read-record head 12 for recording on the recording medium along an outer circular track, and network 80 applies an electrical signal to read-record head 13 for recording along an inner track. During readout, read-record head 12 scans the outer circular track and read-record head 13 scans the inner track thereby inducing electrical signals that may be obtained from networks 75 and 80, respectively.

During the record operation, start and stop signals are recorded at the beginning and end of each data sequence. The start and stop signals make it clear in the output circuit at what point the recorded data sequence begins and at what point it terminates. Thus, during readout the recorded data can be readily identified, and an accurate angular alignment between the position of the read-record heads and the recorded data is not required. Upon completion of each of the record cycles and the read cycles, as the case may be, there is generated a release signal. This may be readily provided by one or both of the input output networks. The release signal energizes the solenoid relay 62, the switch contacts 68 of which break the ground connection for solenoid 67. When solenoid 62 is energized, its plunger causes movement of the spring clip 58 to release probe 59 allowing the door 30 to move in its opening direction under influence of leaf spring 61. Deenergization of solenoid 67 causes contacts 69 to be separated and thus deenergizes motor 16.

In one operable embodiment of the described read-record device, the synchronous motor rotates shaft 15 at 1,800 r.p.m. The read-record heads 12 and 13 are embedded in a suitable potting compound and scan circular tracks with diameters of 0.56 inches and 0.43 inches, respectively. The head pole pieces have a width of about 40 mils, which establishes the width of the circular tracks. The pole pieces have 600 turns wound about each leg. The gap spacing between pole pieces is about 2.5 mils. The rotary transformers provide a constant gap between the rotor and stator windings. This gap may be a few mils.

One operable embodiment of the invention has been described in considerable detail for purposes of disclosure. However, it is not intended that the invention be limited to such disclosed details. Rather, it is recognized that numerous modifications and changes may be made to the described device which do not exceed the basic invention herein taught, and the invention is intended to include all such modifications and changes. In particular, although the description is directed to a magnetic recording device and magnetic medium and at present is contemplated as having greatest utility for such application, the broad concepts of the invention are recognized as also applicable to other types of recording devices, e.g., electrostatic or optical recording devices and media.

The appended claims, therefore, are intended to include within their meaning all modifications and variations that fall within the true scope of the invention.

What I claim is:

1. A device for scanning an apertured medium having predetermined markings thereon circularly arranged around said aperture and representing data, said device comprising a scanner, probe means extending from said scanner for positioning said medium and relative to said scanner for scanning said markings, a loading means mounted on said device for receiving said medium from an operator and transferring said medium to said probe means, said loading means comprising a detent pin for insertion into the aperture in said medium by the operator loading the medium into said device, said detent pin prepositioning said medium relative to said probe means and transferring said medium to said probe means upon relative movement of said loading means and said scanner.

2. A device for scanning an aperture medium having predetermined markings thereon circularly arranged around said aperture and representing data, said device comprising a scanner, probe means extending from said scanner for positioning said medium relative to said scanner for scanning said markings, a loading means pivotally mounted on said device for receiving said medium from an operator and transferring said medium to said probe means, said loading means comprising a detent pin for insertion into the aperture in said medium by the operator loading the medium into said device, said detent pin prepositioning said medium relative to said probe means and transferring said medium to said probe means upon rotation of said loading means and said detent pin toward said scanner.

3. The combination set forth in claim 2 wherein the axis of said detent pin is substantially axially aligned with the axis of said probe means during transfer of said medium to said said probe means.

4. The device set forth in claim 3 in further combination with means mounted on said device for restraining said detent pin from engaging said probe means during a scanning operation.

5. The device set forth in claim 3 in further combination with means mounted on said device for restraining said detent pin from engaging said probe means during transfer of said medium to said probe means.

6. A device for scanning an apertured medium having a magnetic recording surface arranged circularly on said medium around said aperture, said device comprising a scanner, probe means extending from said scanner for positioning said medium relative to said scanner for scanning said magnetic surface, a loading means pivotally mounted on said device for receiving said medium from an operator and transferring said medium to said probe means, said loading means comprising a cantilever spring pivotally mounted on said device, and a detent pin mounted on the free end of said cantilever spring for insertion into the aperture in said medium by the operator placing the medium into said loading means, said detent pin prepositioning said medium to said probe means and transferring said medium to said probe means upon relative movement of said loading means and said scanner.

7. The device set forth in claim 6 in further combination with means mounted on said device for restraining said detent pin from engagement with said probe means during a scanning operation.

8. A device for scanning an apertured medium having a magnetic recording surface arranged circularly on said medium around said aperture, said device comprising a scanner, probe means extending from said scanner for positioning said medium relative to said scanner for scanning said magnetic surface, a loading means pivotally mounted on said device for receiving said medium from an operator and transferring said medium to said probe means, said loading means comprising a cantilever spring pivotally mounted on said device, a detent pin mounted on the free end of said cantilever spring for insertion into the aperture in said medium by the operator placing the medium into said loading means, said detent pin prepositioning said medium relative to said probe means and transferring said medium to said problem means upon relative movement of said loading means and said scanner, and a pressure pin mounted for movement axially of said detent pin and actuated upon relative movement of said loading means and said scanner for transferring said medium from said detent pin to said probe means.

9. A device for scanning an apertured medium having a magnetic recording surface arranged circularly on said medium around said aperture, said device comprising a scanner, problem means extending from said scanner for positioning said medium relative to said scanner for scanning said magnetic surface, a loading means pivotally mounted on said device for receiving said medium from an operator and transferring said medium to said probe means, said loading means comprising a door, a cantilever spring pivotally mounted between said door and said scanner and arranged for movement with said door, a detent pin mounted on the free end of said cantilever spring for insertion into the aperture in said medium by the operator placing the medium into said loading means, said detent pin prepositioning said medium relative to said probe means and being axially aligned with said probe means during transfer of said medium to said probe means upon rotation of said door toward said scanner, and a spring biased pressure plate mounted for movement axially of said detent pin and actuated upon rotation of said door toward said scanner for transferring said medium from said detent pin to said probe means.

10. The device set forth in claim 9 in further combination with means mounted on said device for restraining said detent pin from engaging said probe means in door closed position.